Nov. 25, 1924.

S. M. SPALDING 1,516,582

CAKE BOX

Filed Oct. 28, 1922

INVENTOR
Susan M. Spalding,
BY
Duell, Warfield & Duell
ATTORNEY

Patented Nov. 25, 1924.

1,516,582

UNITED STATES PATENT OFFICE.

SUSAN M. SPALDING, OF ATLANTA, GEORGIA.

CAKE BOX.

Application filed October 28, 1922. Serial No. 597,479.

*To all whom it may concern:*

Be it known that I, SUSAN M. SPALDING, a citizen of the United States, residing at Atlanta, in the county of Fulton and State of Georgia, have invented certain new and useful Improvements in Cake Boxes, of which the following is a full, clear, and exact description, such as will enable others skilled in the art to which it appertains to make and use the same.

This invention relates to improvements in boxes, and with respect to its more specific features to boxes for holding cakes and the like.

One of the objects of the invention is the provision of a container, or box, adapted to protect as well as keep the contents in a fresh condition and also adapted for rearrangement of its parts so as to provide for ready access and convenient manipulation of the contents.

Another object is to provide a box of the class described, composed of a base for supporting the cake in an accessible position, and a cover for enclosing the cake on the base, supported by the base in such manner that the base forms a means for grasping the box to move the box and cake.

Another object is to provide in a box of the class described a support for the cake spaced above a table or the like when the box is resting thereon, to provide an air chamber below the support.

Another object is to provide a support having a crumb receiving channel or trough at the outer edge of the cake when on the support.

Another object is to provide a support for the cake having an annular trough-like extension for receiving the lower edge of the cover, offset below the cake support to space the support above a table or the like.

Another object is to provide a support for the cake having a trough-like extension on which the cover rests, and offset downwardly from the support to space the same above a table or the like and connected to the support by a flange forming a stop to limit the lateral movement of the cover.

Other objects will be in part obvious and in part pointed out hereinafter.

The invention accordingly consists in the features of construction, combinations of elements and arrangements of parts which will be exemplified in the construction hereinafter set forth, and the scope of the application of which will be indicated in the following claims.

Figure 1:
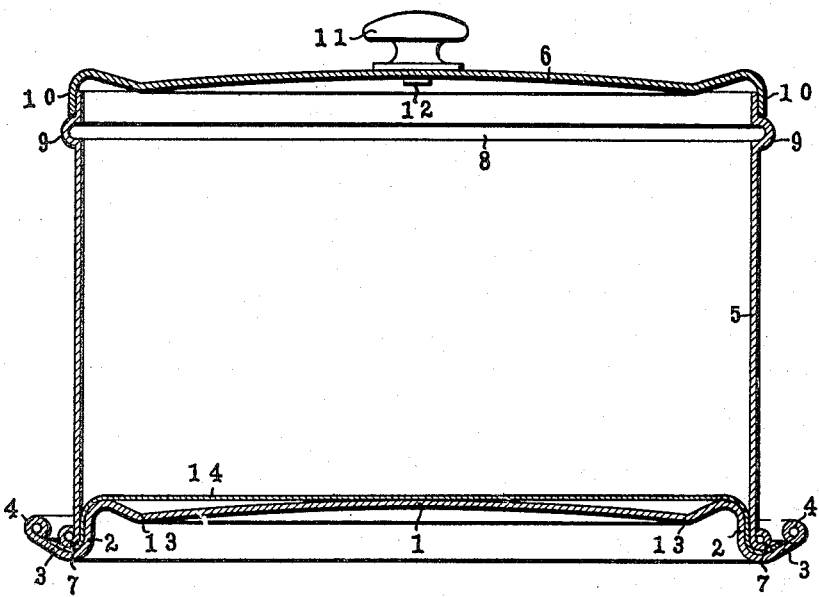
Figure 2:
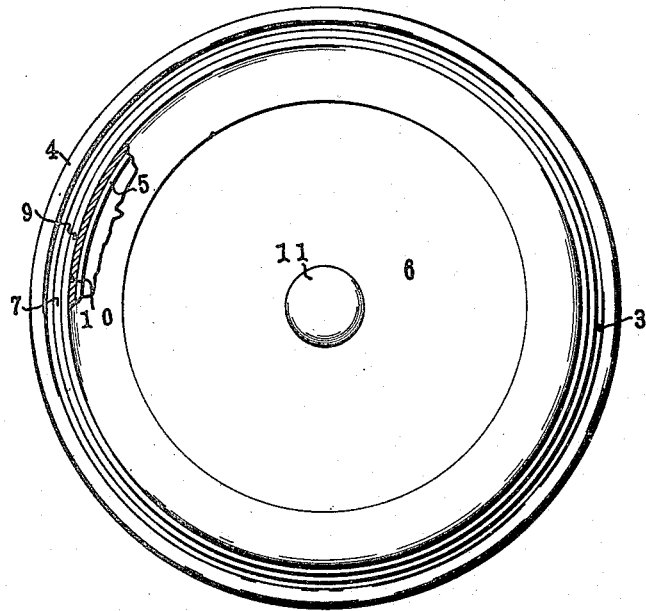
Figure 3:
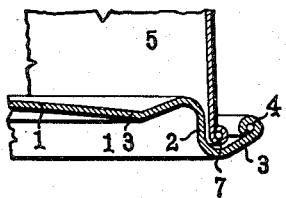

In the accompanying drawings forming a part of this specification wherein similar reference characters refer to similar parts throughout the several views, Figure 1 is a vertical section of the improved cake box, Fig. 2 is a plan view with a part of the cover broken away, Fig. 3 is an enlarged detail in section at the point where the cover engages the base with the sealing sheet removed.

Figure 4:
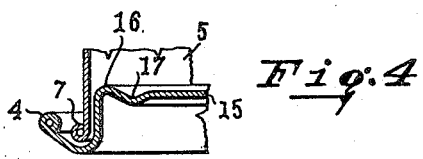

Fig. 4 is an enlarged detail in section of an alternate construction.

In the present embodiment of the invention, the box comprises a base, for supporting the cake, and a cover, supported by the base.

The base includes a centrally disposed surface, or plate 1, the peripheral portion of which turns downwardly as indicated so as to provide the circumferential depending flange 2 which not only gives stiffness to the plate but also acts as a standard to support the plate 1 in position raised from the table or other bed on which the box may rest. The material of this flange also extends outwardly and upwardly all around so as to provide the extension 3 the outer edge of which is beaded as indicated at 4, thus providing a circumferential handle and lifting member which may be readily grasped by reason of the extension 3 terminating above the surface on which the box rests. Between the flange 2 and the extension 3 is the trough-like recess which extends below the plate 1, the open face of this trough being upwardly presented and adapted to receive the open end of the body 5 of the cover. The body 5 at its lower end encircles the outside of the flange 2 and this flange forms a limiting stop for limiting the lateral movement of the cover with respect to the base, besides cooperating with the cover to enclose the contents of the box. The cover may rest on the extension 3, and the trough is sufficiently deep to permit telescopic relation between the base and cover to a substantial extent, as illustrated, so as to retain the cover in place against accidental lateral displacement and to give a protective joint at this point.

The cover comprises the body 5 and a top 6. The lower edge of the body is beaded as shown at 7, and this bead rests in the trough alongside the bead 4 of the base, the body fitting loosely about the flange 2. Near its top the body is grooved internally as shown at 8 to provide an external rib 9, and the top 6 has a depending flange 10 which telescopes and fits around the top of the body, and is limited in its downward movement by the body.

The engagement between the flange 10 and the body is a frictional engagement, and tight enough to prevent displacement of the top, when the cover is lifted from the base. For convenience in lifting the cover, a knob 11 is secured to the top at the center thereof, the knob having a stem 12, which is secured to the top in any suitable or desired manner. Referring to Figure 1, it will be noticed that the surface 1 for supporting the cake inclines downward slightly from the center, in every direction and a channel 13 is formed in the upper face of the surface 1, near the flange 2, the inner wall of the channel being continuous with the surface 1. The surface 1 inclining as it does from the center, provides for drainage of any condensed moisture which may settle thereon into the channel, and also permits the crumbs which may result from cutting the cake to be brushed outward away from the center. The outer wall of the trough 3 is extended well beyond the peripheral surface of the body 5 of the cover, and provides a convenient handle for lifting the entire box. The trough also provides a guide for properly centering the cover when it is placed on the base. When the box is used for transporting a cake, as in shipping, a sheet 14 of flexible material, as for instance paper or cloth is arranged on the surface 1, the cake being seated on the sheet 14. This sheet extends between the flange 2 and the body 5 of the cover, and beneath the lower beaded edge 7 of the cover, and it is of sufficient thickness to make a tight seal between the body and the flange. When the box is used merely to store cake in the home, the sheet 14 is removed. When so removed, the cover 5 fits loosely about the flange, and it may be easily lifted to permit access to the cake. When the cover is in place on the base, the beads 4 and 7 underlie the thumbs, as the base is conveniently grasped between the thumbs and fingers and lifted for transportation, so that the open edge of the cover is retained in the trough and the cover is prevented from accidental upward movement out of box closing relation to the trough. Any excess moisture which may collect upon the upper surface of the central supporting plate of the base will gravitate toward the circumferential groove of said plate by reason of the inclination of such plate in all directions from its center toward said groove. While the supporting surface for the cake is shown as inclining downwardly in all directions from the center, I also contemplate making the supporting surface plane, as shown in Fig. 4, wherein the cake supporting surface of the base 15 is flat there being a slight annular elevation or rib 16 encircling this space which acts as a limiting rib for preventing displacement of the cake, and also serves as a crumb receiving groove, it being understood that the rib is spaced from the periphery of the cake, that is that the circular area within the rib is greater than the area of the bottom of the cake. The base is otherwise the same as that shown in Figs. 1 and 3. It will be noticed that there is an annular depression 17 just inside the rib, in which the crumbs are received. In the construction of Fig. 1, the outer wall of the groove 13 acts in the same manner as the rib 17 of Fig. 4, to present displacement of the cake.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described, and all statements of the scope of the invention, which, as a matter of language, might be said to fall therebetween.

Having described my invention, what I claim as new and desire to secure by Letters Patent is:

1. A portable box of the character described including, in combination, a base and a removable cover, the base comprising a centrally disposed article supporting plate the periphery of which turns downwardly and provides a circumferential depending flange adapted to support said plate in raised position, the material of said flange extending outwardly and upwardly from its lower edge and terminating in a bead so as to provide a circumferential handle and lifting member for said plate and an upwardly presented cover-receiving trough outside of and extending below said plate, said cover having its open end beaded and adapted to encircle the outside of said depending flange and be received in said trough with its bead alongside said bead of said base.

2. A portable box of the character described including, in combination, a base and a removable cover, the base comprising a centrally disposed article supporting plate, the periphery of which turns downwardly and provides a circumferential depending flange adapted to support said plate in raised position, the material of said flange extending outwardly and upwardly from its lower edge and terminating in a bead so as to provide a circumferential handle and lifting member for said plate and an upwardly presented cover-receiving trough outside of and extending below said plate, said cover having its open end beaded and adapted to encircle the outside of said depending flange and to be received in said trough with its bead alongside said bead of said base, and a removable flexible article supporting cloth lying on said plate and extending between said flange and the flange-encircling portion of said body into said trough.

3. A portable box of the character described, including in combination, a base and a removable cover, the base comprising a centrally disposed article supporting plate, the periphery of which turns downwardly and provides a circumferential depending flange adapted to support said plate in raised position, the material of said flange extending outwardly and upwardly from its lower edge and terminating in a bead so as to provide a circumferential handle and lifting member for said plate and an upwardly presented cover-receiving trough outside of and extending below said plate, said cover having its open end beaded and adapted to encircle the outside of said depending flange and be received in said trough with its bead alongside said bead of said base, said plate having a circumferential groove between said flange and its centre, and inclining downwardly in all directions from said centre towards said groove.

In testimony whereof I affix my signature, in the presence of two witnesses.

SUSAN M. SPALDING.

Witnesses:
H. L. COLLINSWORTH,
NELLIE COLLINSWORTH.